Feb. 8, 1966      F. S. SMITH      3,233,881

GAS SCRUBBER

Filed Dec. 10, 1962      2 Sheets-Sheet 1

INVENTOR
FRANK S. SMITH
BY
ATTORNEY

Feb. 8, 1966  F. S. SMITH  3,233,881
GAS SCRUBBER
Filed Dec. 10, 1962  2 Sheets-Sheet 2
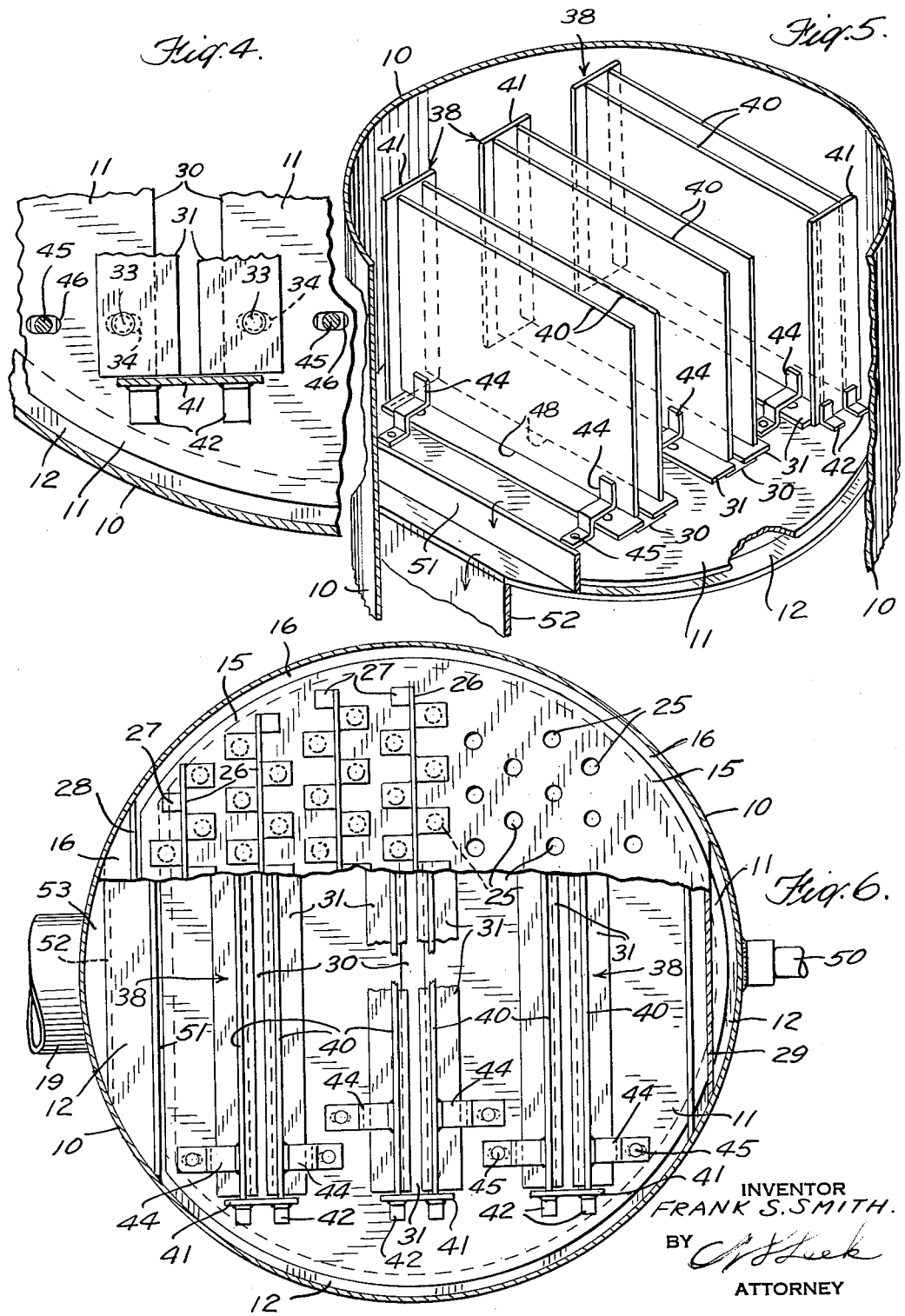

United States Patent Office 3,233,881
Patented Feb. 8, 1966

3,233,881
GAS SCRUBBER
Frank S. Smith, West Wimbledon, London, England
(% Peabody Engineering Corp., 232 Madison Ave., New York, N.Y.)
Filed Dec. 10, 1962, Ser. No. 243,374
3 Claims. (Cl. 261—109)

This invention relates to scrubbers of the gas-liquid contact type and more particularly to a scrubber of the type having one or more perforated plates carrying a blanket of liquid through which the gas passes.

An object is to provide a scrubber of the above type having novel and improved characteristics.

Another object is to provide such a scrubber with improved means for agglomerating sub-micron particles.

Another object is to provide a scrubber of the above type having a slotted plate with each slot registering with a superimposed duct or chimney through which the rising particle laden gas passes and entrains liquid in a manner to produce fine spray and to improve the turbulence of the gas-liquid mixture.

Various other objects and advantages will be apparent as the nature of the invention is more fully disclosed.

In accordance with this invention it has been found that in a zone comprising a slotted plate carrying a blanket of liquid and having a duct or chimney disposed above and in alignment with each slot improved agglomerating results are obtained by forming the duct of a width in excess of that of the slot. This feature provides a greater cross-sectional area for the rising mixture of gas and liquid than for the gas which passes through the slot. Such increased area reduces the resistance to the upward flow of the mixture, permits the entrainment of more liquid per pound of gas and causes the entrained liquid to open up and be dispersed (as a finer spray) in the rising gas stream. Increased turbulence is thus produced which causes more effective wetting and agglomeration of the particles and in particular particles which may be of sub-micron size which facilitates their removal from the gas stream in subsequent gas-liquid contact zones.

The nature of the invention will be better understood from the following description, taken in connection with the accompanying drawings in which a specific embodiment has been set forth for purposes of illustration.

In the drawings:

FIG. 4 is a partial horizontal section taken on the line 4—4 of FIG. 2 but on a larger scale;

FIG. 5 is a broken isometric view of a portion of the tower showing the slotted plate and chimneys; and FIG. 6 is an enlarged horizontal sectional view taken on the line 6—6 of FIG. 1.

Figure 1:
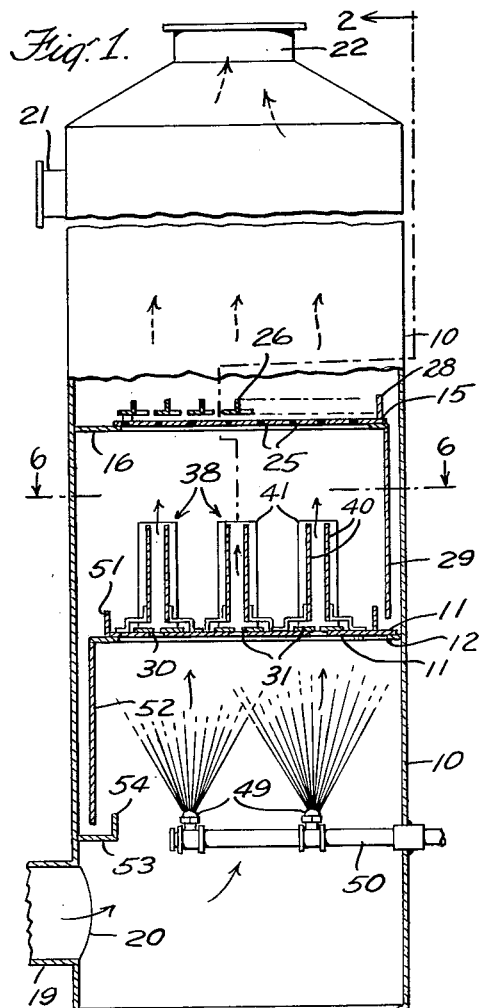
FIG. 1 is a vertical section through a scrubber embodying the invention.
Figure 2:
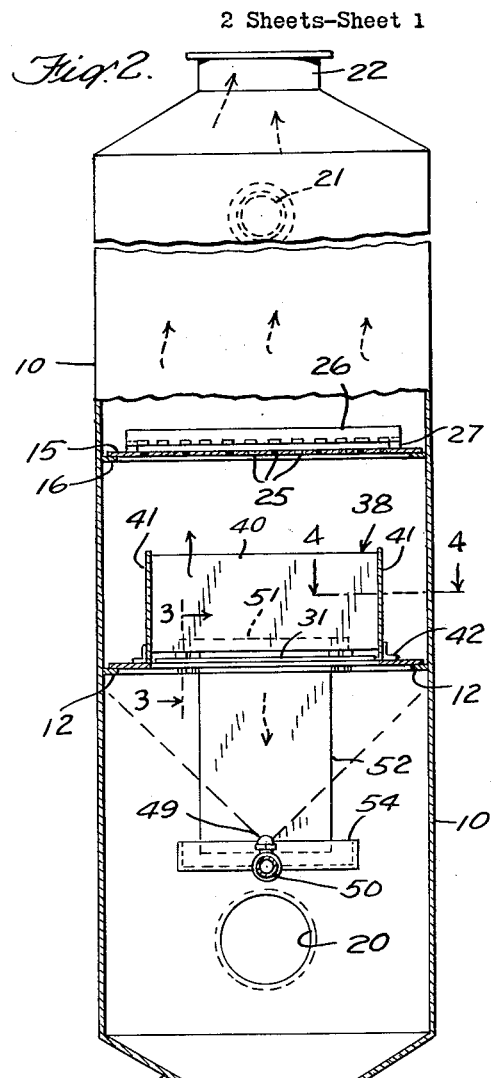
FIG. 2 is a vertical section taken on the line 2—2 of FIG. 1.
Figure 3:
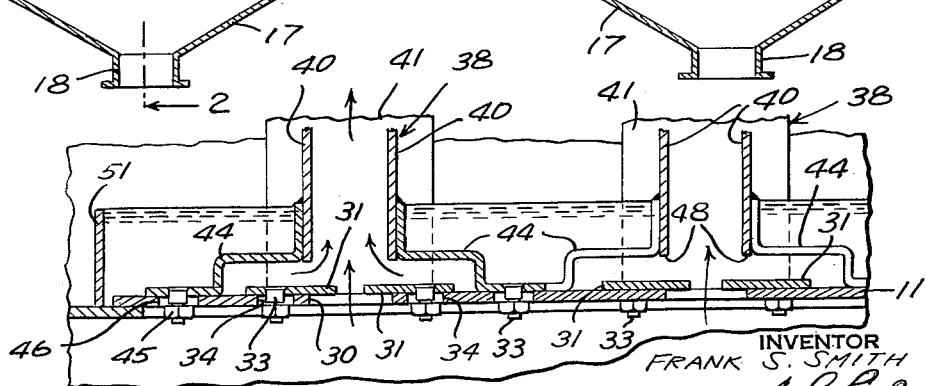
FIG. 3 is a partial vertical section taken on the line 3—3 of FIG. 2 but on a larger scale.

Referring to the drawings more in detail, the invention is shown as embodied in a scrubber comprising a shell 10 having near its lower end a horizontal slotted plate 11 secured to a ring 12 carried by the shell 10 and a horizontal baffle plate 15 spaced above the plate 11 and secured to a ring 16 carried by the shell 10. It is to be understood that a sequence of such slotted plates and baffle plates may be carried by the shell 10 to provide a plurality of gas-liquid contact zones within the scrubber or, in some instances, a plurality of slotted plates may be stacked one above the other for the purpose to be described.

Below the lower slotted plate 11 the scrubber is formed with a coned bottom 17 having a liquid drain outlet 18 through which the treated liquid is removed. Gas to be scrubbed is introduced through a gas inlet pipe 19 having an opening 20 below the lowermost plate 11. This may provide either radial or tangential admission. Liquid for contact with the rising gas is fed to the scrubber through a pipe 21. The scrubber above the upper plate 15 contains the usual liquid eliminator section, not shown, and the scrubbed gas is discharged through a top opening 22.

The baffle plate 15 contains a plurality of perforations 25 through which the gas rises and above which are disposed baffle strips 26 which deflect the gas stream and introduce turbulence for improving the gas liquid contact. The strips 26 are mounted on spacer blocks 27 carried by the plate 15. The liquid level on the plate 15 is controlled by a weir 28 from which the liquid overflows onto the plate below through a duct formed by the shell 10 and a plate 29 which forms a seal with the liquid blanket on the plate 11 below.

The parts of the scrubber thus far described are similar to those disclosed and described in Graham Patent No. 2,457,658 and only so much thereof has been set forth herein as is necessary for an understanding of this invention.

In accordance with this invention the plate 11 is formed with a plurality of narrow rectangular slots 30 having an area such that the rising gas prevents the liquid from flowing downwardly therethrough. In the embodiment shown one of the slots 30 extends diametrically across the plate 11 and the other slots 30 are parallel thereto. However, the slots may be arranged radially or otherwise disposed if desired. Adjacent each slot 30 the plate 11 carries a pair of sliding strips 31 which are adjustably secured to the plate 11 by bolts 33 extending through slots 34 in the plate so that the effective width of the slots can be adjusted in accordance with the requirements of a particular case. The strips may of course be omitted if adjustability of the slot width is not required.

Above each slot 30 a chimney 38 is provided in the form of a rectangular duct having side walls 40 and end walls 41. The end walls 41 are mounted to the plate 11 by brackets 42 and the side walls 40 are mounted on brackets 44 which are adjustably mounted on the plate 11 by bolts 45 extending through elongated slots 46 in the plate and arranged so that the width of the rectangular duct can be adjusted by sliding the side walls 40 toward or away from each other. The lower edges 48 of the side walls 40 are spaced below the level of the liquid blanket on the plate 11 for the purpose to be described. The lower edges of the end walls 41 may or may not be so spaced above the plate 11. The upper edges of the walls 40 and 41 are spaced below the under surface of the plate 15 next above by an amount such that the liquid spray rising through the chimney impinges on and washes the under surface of such plate and falls back into the blanket of liquid on the plate 11. It will be noted that the width of the rectangular duct may be more than twice the width of the slot above which the duct is located. Such a relation is an essential feature of the invention and improves the effectiveness of the gas-liquid contact within the chimney as explained below.

Of course the chimneys may be fixed instead of adjustable if desired and end plates 41 and side plates 40 incorporated into a unitary structure.

The underside of the plate 11 may be washed by a spray from nozzles 49 which are supplied by a pipe 50 with the scrubbing liquid. A predetermined liquid level is maintained on the plate 11 by a weir 51 over which the liquid flows through a duct formed by the shell 10 and a plate 52 which forms a liquid seal with the liquid in a channel 53 having an outer wall 54 over which the liquid flows into the outlet 18. In the operation of this scrubber the liquid flows downwardly over the various plates forming a liquid blanket on each plate through which the rising gas passes. The gas rising through the slots 30 aspirates the liquid from the blanket on this plate and carries the liquid upwardly in the form of a spray through the aligned chimney 38 wherein wetting, intermingling and agglomeration of the sub-micron particles take place due to the turbulence of the mixture. This turbuence is increased due to the increased width of the chimney compared to the underlying slot which permits the particles of liquid to open up in the form of a spray of lesser density as the mixture progresses upwardly. This spray with its agglomerated particles is discharged from the top of the chimney in a manner similar to a fountain which washes the undersurface of the plate above and then falls back into the liquid blanket of the plate 11. A portion of the spray is picked up by the gas and carried through the perforations 25 while the remainder of the spray falls back into the liquid blanket on the plate 11. The agglomerated particles are in a condition to be more readily removed by the liquid on the perforated plate 15. This apparatus is particularly effective for the removal of sub-micron particles in materials such as fume, smoke, or the like.

The relative widths of the slots and of the chimney may be adjusted in accordance with the characteristics of the material being treated so as to produce the desired amount of turbulence and agglomeration in the chimneys for conditioning the particles for the most efficient removal in the subsequent baffle plate sections. In each case however the width of the chimney should be in excess of the width of the slot for the reasons above set forth.

What is claimed is:

1. A gas scrubber comprising a plurality of spaced trays, means to provide a flow of a liquid as a liquid blanket of predetermined thickness in sequence over said trays, said trays having openings for the upward flow of gas to be treated through said trays and through the liquid blanket thereon, at least one of said trays comprising a plate having slots therein for the upward flow of gases and adjustable closure plates slidably disposed on said slotted plate on opposite sides of each of said slots, and means securing said slidable closure plates in adjusted position for thereby varying the effective slot within, an open-ended chimney disposed above and registering with each of said slots, said chimney being formed by side and end walls the upper parts of which extend above the level of the liquid blanket on said slotted tray, said walls terminating upwardly below the under surface of the next adjustment tray by a distance such that the spray from the upward flow of gas and entrained liquid impinges on such under surface for washing the same, the lower ends of said walls being disposed below the level of said liquid blanket, the lower ends of said sidewalls being spaced above said tray to provide a passage for said liquid from said blanket into the lower end of said chimney, said chimney having throughout its height a width greater than the effective width of said slot whereby wetting, turbulence and agglomeration of particles are promoted.

2. A gas scrubber as set forth in claim 1 in which means is provided to mount said side walls on said slotted tray for transverse adjustment adapted to vary the width of said chimney and means is provided to secure said side walls in adjusted position.

3. A gas scrubber as set forth in claim 2 in which said end walls are fixed to said tray and means is provided to mount said side walls to slide therebetween.

References Cited by the Examiner

UNITED STATES PATENTS

| 2,222,565 | 11/1940 | Kraft | 261—76 |
| 2,457,658 | 12/1948 | Graham | 261—114 |
| 2,678,201 | 5/1954 | Koch. | |
| 2,817,411 | 12/1957 | Coberly | 261—78 |
| 2,917,293 | 12/1959 | Mendelsohn et al. | 261—114 |
| 2,964,304 | 12/1960 | Rice | 261—118 |
| 3,125,614 | 3/1964 | Mayfield et al. | 261—114 |

FOREIGN PATENTS

| 1,237,299 | 6/1960 | France. |

HARRY B. THORNTON, *Primary Examiner.*
RONALD R. WEAVER, *Examiner.*